(12) United States Patent
Liu

(10) Patent No.: US 6,859,362 B2
(45) Date of Patent: Feb. 22, 2005

(54) COMPUTER ENCLOSURE WITH SLIDABLY MOUNTED DRIVE BRACKET

(75) Inventor: Alvin Liu, Tu-chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 139 days.

(21) Appl. No.: 10/388,097

(22) Filed: Mar. 13, 2003

(65) Prior Publication Data

US 2004/0085725 A1 May 6, 2004

(30) Foreign Application Priority Data

Nov. 20, 2002 (TW) .................................. 91218632 U (51) Int. Cl.[7] .................................................. G06F 1/16
(52) U.S. Cl. .................. 361/685; 361/688; 165/80.3; 454/186
(58) Field of Search ................................ 361/679–687, 361/724–727, 694–697, 715; 415/208, 208.1–208.3; 165/80.3, 121–126; 454/184–186

(56) References Cited

U.S. PATENT DOCUMENTS 6,250,727 B1    6/2001    Kan et al.
6,275,377 B1 *  8/2001    Liu et al. .................... 361/685
6,456,489 B1 *  9/2002    Davis et al. ................ 361/684
6,717,816 B1 *  4/2004    Tanaka et al. .............. 361/728

FOREIGN PATENT DOCUMENTS

TW    301422    3/1997
TW    414421    12/2000
TW    417800    1/2001

* cited by examiner

Primary Examiner—Hung Van Duong
(74) Attorney, Agent, or Firm—Wei Te Chung (57) ABSTRACT

A computer enclosure includes a case (10), a first rail (20), a second rail (30), a third rail (40), a drive bracket (50) and a motherboard support tray (60). The case includes a bottom wall (12), a front wall (14), and a rear wall (16). The first rail is mounted to a side portion of the bottom wall that is parallel and close to the front wall. The second rail is mounted to the bottom wall, the second rail being spaced from and parallel to the first rail. The third rail is mounted to a side portion of the bottom wall that is parallel and close to the rear wall. The drive bracket is slid between the first and second rails, and is thus removably mounted in the case. The motherboard support tray is slid between the second and third rails, and is thus removably mounted in the case.

28 Claims, 10 Drawing Sheets

COMPUTER ENCLOSURE WITH SLIDABLY MOUNTED DRIVE BRACKET

BACKGROUND OF THE INVENTION

1. Field of the Invention

The present invention relates to computer enclosures with slidably mounted drive brackets, and particularly to a computer enclosure which is readily and conveniently assembled.

2. Related Art

A conventional computer enclosure comprises a case that is typically in the form of a rectangular frame, and comprises a bottom wall, a top wall, a front wall and a rear wall. The case encloses components such as a floppy drive, a hard drive, a CD-drive, and so on. Drive cages and a motherboard support tray are also arranged in the case. The drive cages and the motherboard support tray are secured in the case by hooks or screws. Typical such computer enclosures are disclosed in Taiwan Patent Publications Nos. 414421 and 417800. However, it is not easy to detach the drive cages and the motherboard support tray from the case. For example, drives in the drive cages or electronic components on the motherboard may need to be tested or replaced. Because of the difficulty in detaching the drive cages or the motherboard support tray, testing and replacement are routinely performed with the drive cages or the motherboard support tray remaining in the enclosure. In such instances, the operations are cumbersome and time-consuming, especially because of limited space in the enclosure.

In order to circumvent the above-described problems, a pivotable motherboard support tray has been devised. As disclosed in Taiwan Patent Publication No. 301422, the motherboard support tray is integrally formed with a rear wall of a computer enclosure. A plurality of holes is defined in a rearmost portion of a bottom plate of the computer enclosure. A plurality of T-shaped tabs is formed on a bottom edge of the motherboard support tray, corresponding to the holes. The T-shaped tabs are inserted into the holes of the motherboard support tray, thereby pivotably attaching the rear wall to a case of the computer enclosure. However, when the rear wall is rotated up to a closed position, it must be fastened to the case with conventional fasteners such as rivets or screws. Accordingly, in assembly of the computer enclosure, an operator needs to align the rear wall with the case by hand. This is unduly inconvenient and time-consuming. In mass production facilities, these difficulties translate into increased costs.

Thus, a computer enclosure which overcomes the above-mentioned problems is desired.

SUMMARY OF THE INVENTION

Accordingly, an object of the present invention is to provide a computer enclosure which is readily and conveniently assembled.

To achieve the above-mentioned object, a computer enclosure in accordance with the present invention comprises a case, a first rail, a second rail, a third rail, a drive bracket and a motherboard support tray. The case comprises a bottom wall, a front wall perpendicularly extending from a front side of the bottom wall, and a rear wall perpendicularly extending from an opposite rear side of the bottom wall. The first rail is mounted to a side portion of the bottom wall that is parallel and close to the front wall. A first sliding space is defined in the first rail. The second rail is mounted to the bottom wall, such that the second rail is spaced from and parallel to the first rail. A second sliding space is defined in the second rail, opposite from and corresponding to the first sliding space of the first rail. A third sliding space is defined in the second rail opposite from the second sliding space. The third rail is mounted to a side portion of the bottom wall that is parallel and close to the rear wall. A fourth sliding space is defined in the third rail, opposite from and corresponding to the third sliding space. The drive bracket is slid along the first and second sliding spaces, and is thus removably mounted in the case. The motherboard support tray is slid along the third and fourth sliding spaces, and is thus removably mounted in the case.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
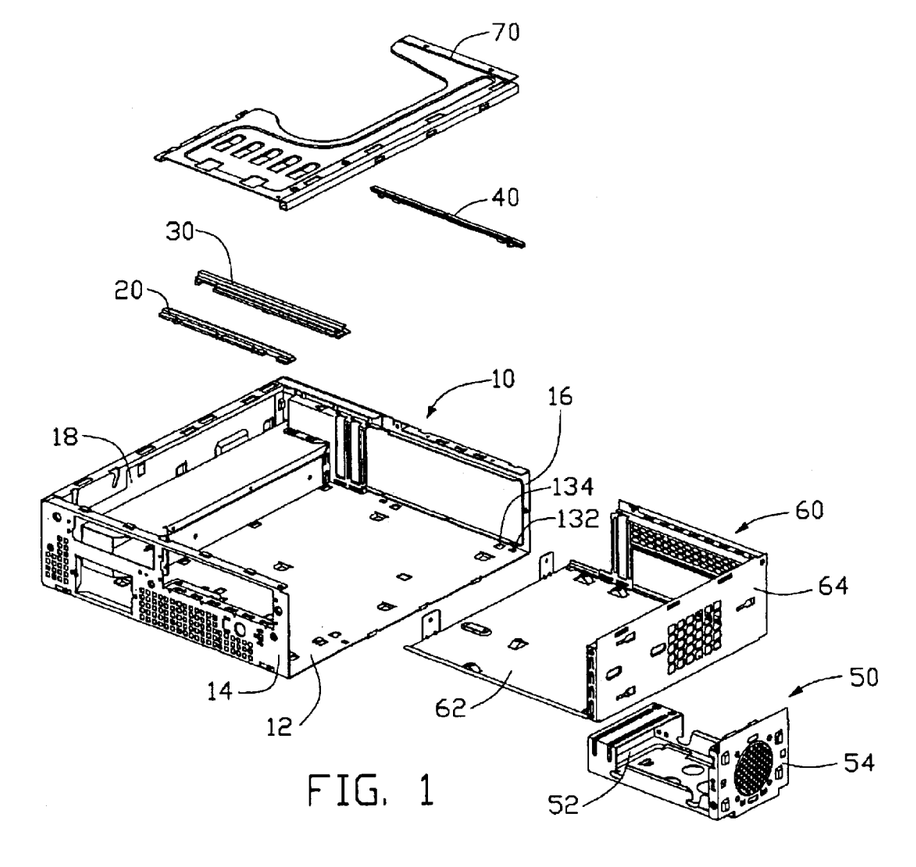
FIG. 1 is an exploded, isometric view of a computer enclosure in accordance with the preferred embodiment of the present invention.

Referring to FIG. 1, a computer enclosure in accordance with the present invention comprises a case 10, a first rail 20, a second rail 30, a third rail 40, a drive bracket 50, a motherboard support tray 60 and a reinforcing plate 70.

Figure 2:
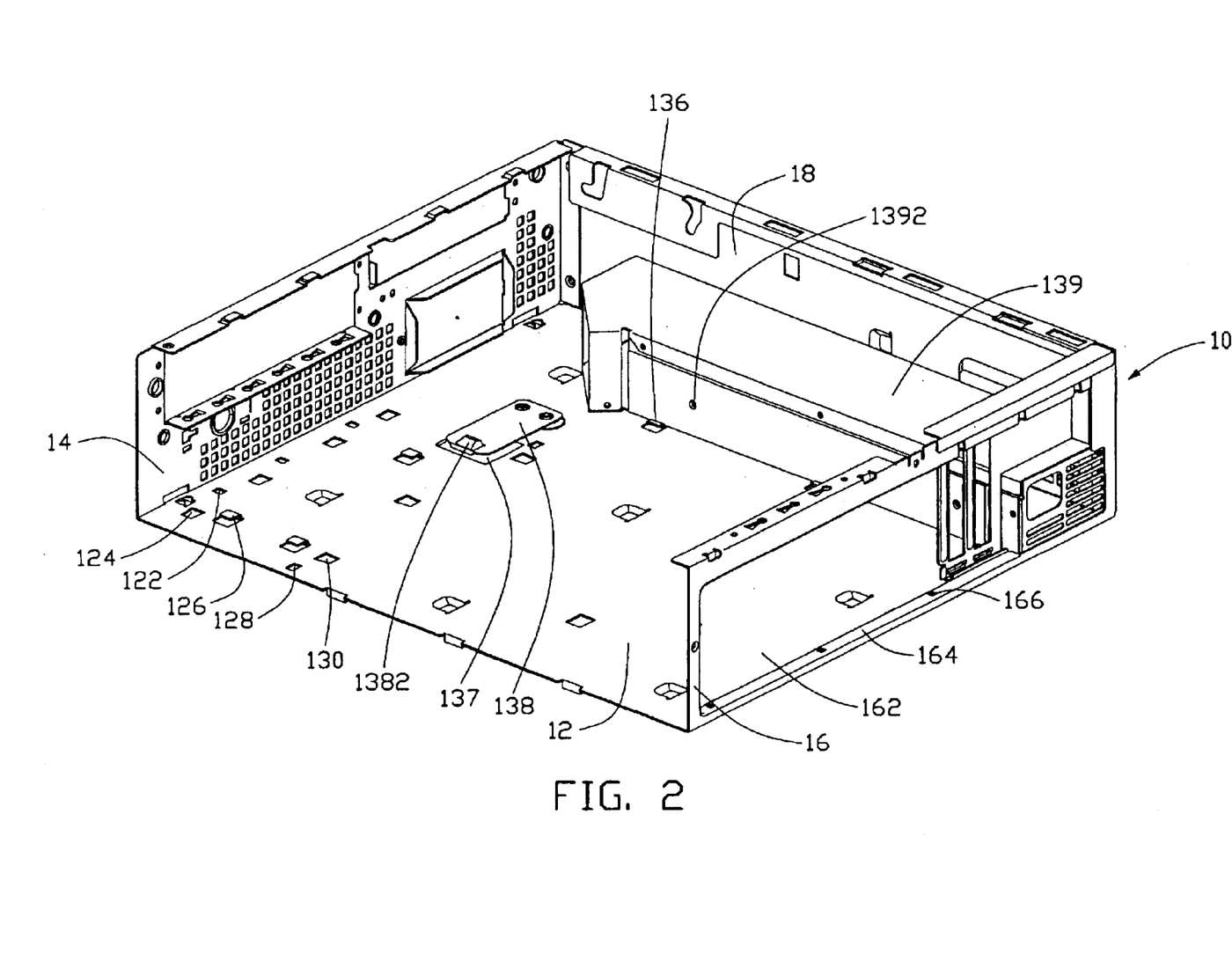
FIG. 2 is an enlarged, isometric view of a case of the computer enclosure of FIG. 1, but viewed from another aspect.

Referring also to FIG. 2, the case 10 comprises a bottom wall 12, a front wall 14 and a rear wall 16 perpendicularly extending from two opposite sides of the bottom wall 12 respectively, a first sidewall 18 extending from the bottom wall 12, and an opening defined at a side of the case 10 that is opposite from the first sidewall 18. Three aligned first square holes 122 are defined in the bottom wall 12, close and parallel to the front wall 14. Four aligned first trapezoidal holes 124 are defined in the bottom wall 12, close and parallel to the front wall 14. The first trapezoidal holes 124 are more distant from the front wall 14 than the first square holes 122. Three L-shaped first hooks 126 are upwardly formed from the bottom wall 12, at a side of the first trapezoidal holes 124 that is distal from the front wall 14. Two second square holes 128 are defined in the bottom wall 12, parallel to the front wall 14. The second square holes 128 are more distant from the front wall 14 than the first hooks 126. Three second trapezoidal holes 130 are defined in the bottom wall 12, generally between the second square holes 128. Two third square holes 132 are defined in the bottom wall 12, close and parallel to the rear wall 16. Two third trapezoidal holes 134 are defined in the bottom wall 12, generally between the third square holes 132. Two L-shaped second hooks 136 are upwardly formed from the bottom wall 12, at a side of the third trapezoidal holes 134 that is distal from the rear wall 16.

A recessed receiving portion 137 is formed in the bottom wall 12. A resilient plate 138 is attached to the bottom wall 12 at a side of the receiving portion 137 that is nearest to the first sidewall 18, such that a distal portion of the resilient plate 138 is suspended above the receiving portion 137. A detent block 1382 is upwardly formed at a distal most end of the resilient plate 138. A power supply rack 139 is provided at a side portion of the bottom wall 12 that is adjacent the first sidewall 18. Two fastening holes 1392 are defined in the power supply rack 139. A mounting opening 162 is defined in the rear wall 16, for receiving computer components that are ordinarily disposed in the case 10 at the rear wall 16. A horizontal retaining edge 164 is inwardly bent from the rear wall 16 at a bottom extremity of the mounting opening 162. Three retaining apertures 166 are defined in the retaining edge 164.

Figures 3, 4:
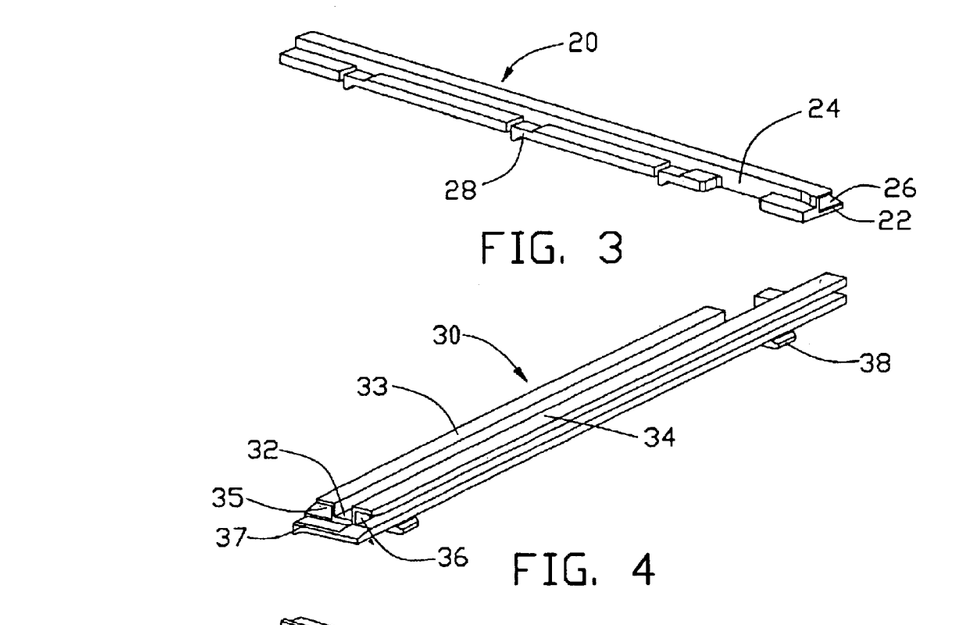
FIG. 3 is an enlarged, isometric view of a first rail of the computer enclosure of FIG. 1.
FIG. 4 is an enlarged, isometric view of a second rail of the computer enclosure of FIG. 1, but viewed from another aspect.
Figure 5:
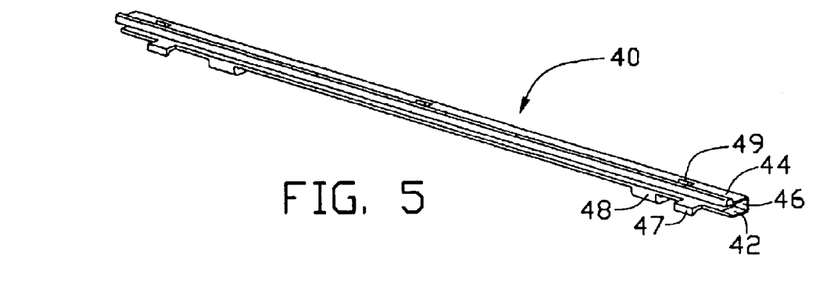
FIG. 5 is an enlarged, isometric view of a third rail of the computer enclosure of FIG. 1.

Referring to FIGS. 3 to 5, the first rail 20 is for mounting at a side of the bottom wall 12 of the case 10 that is close to the front wall 14. The first rail comprises a first base plate 22, and a first railing 24 perpendicularly extending from the first base plate 22. A profile of the first railing 24 is L-shaped, and a first sliding space 26 is defined between the first base plate 22 and the first railing 24. Three hooks 28 are downwardly formed from a long side of the base plate 22 that is opposite from the first sliding space 26. Four L-shaped retaining tabs (not shown) are downwardly formed from a bottom surface of the first base plate 22, corresponding to the first trapezoidal holes 124 of the bottom wall 12.

The second rail 30 is for mounted on the bottom wall 12 of the case 10 at a position spaced from but parallel to the first rail 20. The second rail 30 comprises a second base plate 32, and second and third railings 33, 34 perpendicularly extending from a middle portion of the second base plate 32. A profile of each second and third railing 33, 34 is L-shaped, and the second and third railings 33, 34 are mirror images of each other. A second sliding space 35 is defined between the second base plate 32 and the second railing 33. A third sliding space 36 is defined between the second base plate 32 and the third railing 34. Two hooks 37 are formed at opposite ends of the second base plate 32 respectively, corresponding to the second square holes 128 of the bottom wall 12 of the case 10. Three L-shaped tabs 38 are downwardly formed from a bottom surface of the second base plate 32, corresponding to the second trapezoidal holes 130 of the bottom wall 12.

The third rail 40 is for mounting to a side of the bottom wall 12 of the case 10 that is close to the rear wall 16. The third rail 40 comprises a third base plate 42, and a fourth railing 44 perpendicularly extending from the third base plate 42. A profile of the fourth railing 44 is L-shaped, and a third sliding space 46 is defined between the third base plate 42 and the fourth railing 44. Two spaced hooks 47 are formed at a long side of the third base plate 42 that is opposite from the fourth railing 44. Two L-shaped tabs 48 are downwardly formed from the third base plate 42 between the hooks 47, corresponding to the two third square holes 134 of the bottom wall 12. Three protrusions 49 extend upwardly from a top portion of the fourth railing 44, corresponding to the retaining apertures 166 of the rear wall 16 of the case 10.

Figure 6:
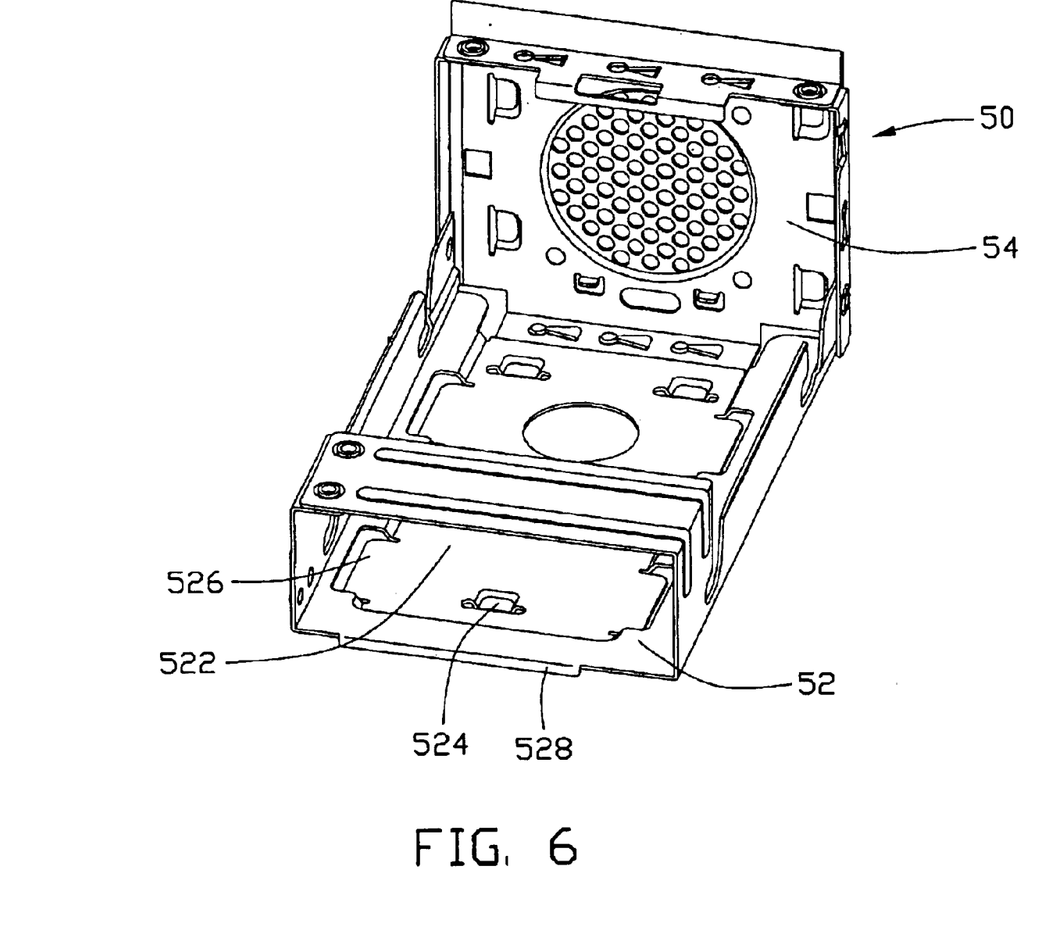
FIG. 6 is an enlarged, isometric view of a drive bracket of the computer enclosure of FIG. 1, but viewed from another aspect.

Referring to FIG. 6, the drive bracket 50 is for receiving a data storage drive (not shown). The drive bracket 50 comprises a bottom plate 52, and a first lateral plate 54 perpendicularly extending from the bottom plate 52. A recess 522 is defined in a central portion of the bottom plate 52. Three retaining portions 524 are downwardly formed in the bottom plate 52, corresponding to the three first hooks 126 of the bottom wall 12 of the case 10. Two wings 526 are formed in the bottom plate 52 at each of two opposite sides of the recess 522, for engaging in the first and second sliding spaces 26, 35 of the first and second rails 20, 30 respectively. A detent plate 528 is downwardly bent from a distal end of the bottom plate 52, corresponding to the detent block 1382 of the resilient plate 138 of the case 10.

Figure 7:
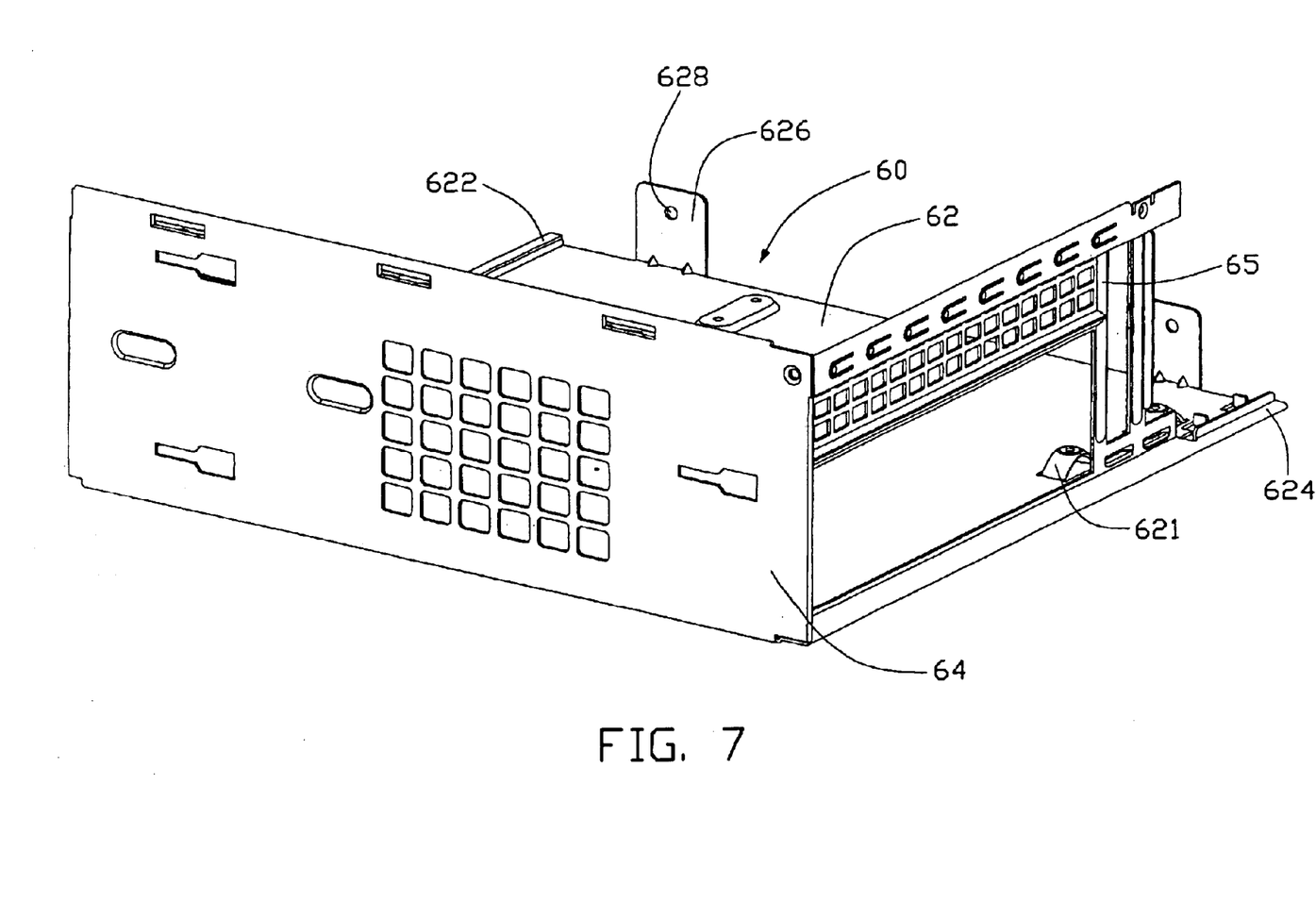
FIG. 7 is an enlarged, isometric view of a motherboard support tray of the computer enclosure of FIG. 1, but viewed from another aspect.

Referring to FIG. 7, the motherboard support tray 60 comprises a horizontal support plate 62, a second lateral plate 64 extending upwardly from a lateral side of the support plate 62, and a rear plate 65 extending upwardly from a rear side of the support plate 62. The rear plate 65 is perpendicular to and adjoins the second lateral plate 64. The support plate 62 upwardly forms a plurality of arched retaining standoffs 621. Each retaining standoff 621 defines a hole (not labeled) therein. Two guiding edges 622, 624 are formed at front and rear sides of the support plate 62 respectively, for engaging in the third and fourth sliding spaces 36, 46 of the second and third rails 30, 40 respectively. Two retaining plates 626 extend upwardly from a lateral side of the support plate 62 that is opposite from the second lateral plate 64. A retaining hole 628 is defined in each retaining plate 626.

Figure 8:
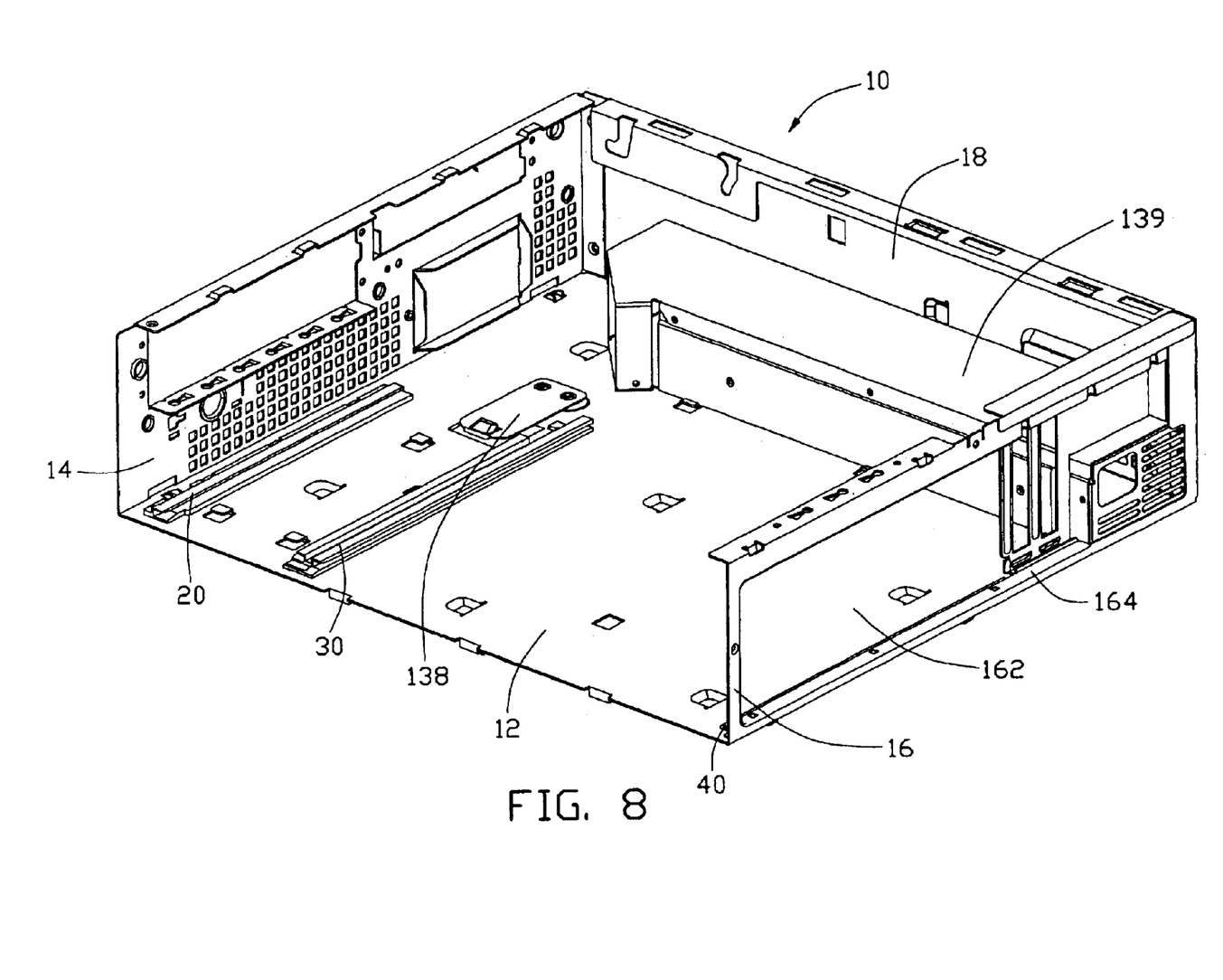
FIG. 8 is an enlarged, isometric view of the first, second and third rails mounted to the case of the computer enclosure of FIG. 1.
Figure 9:
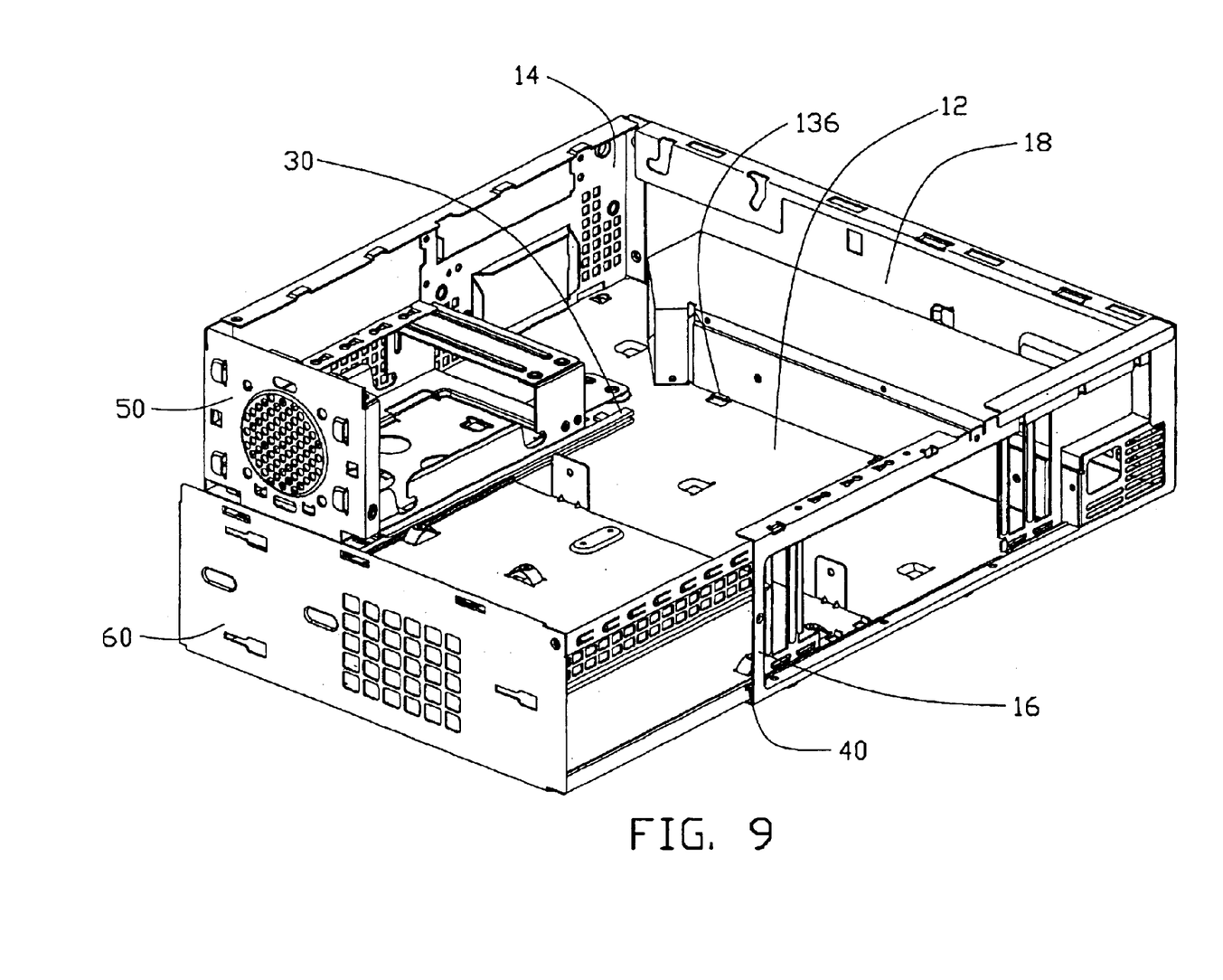
FIG. 9 is similar to FIG. 8, but also showing the drive bracket fully mounted in the case, and the motherboard support tray partially mounted in the case.
Figure 10:
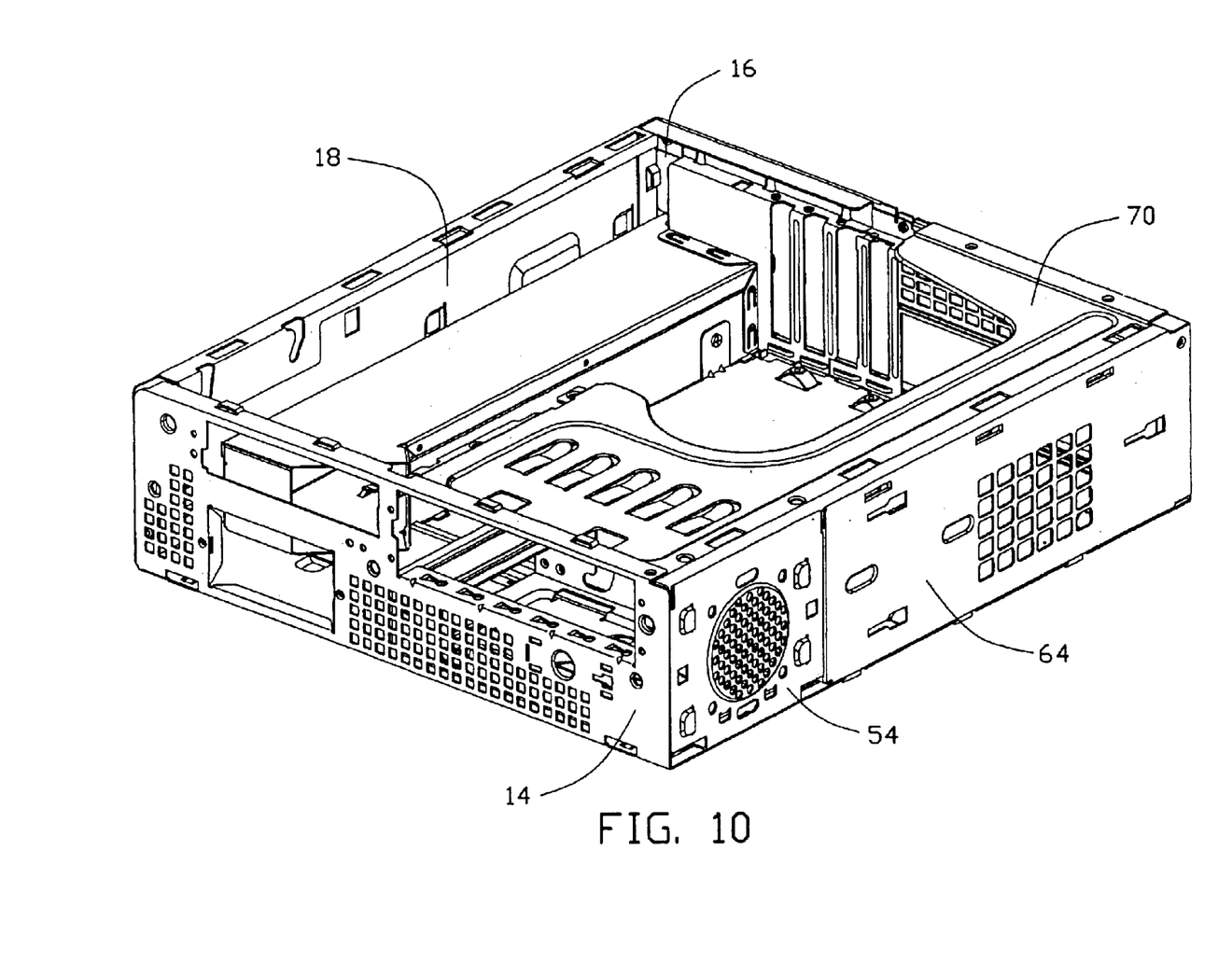
FIG. 10 is similar to FIG. 9, but showing all the components of the computer enclosure of FIG. 1 assembled in the case thereof.

Referring to FIGS. 8 to 10, in assembly of the rails 20, 30, 40 to the case 10, the first rail 20 is placed on the bottom wall 12 of the case 10 parallel and close to the front wall 14. The hooks 28 of the first rail 20 are aligned with the first square holes 122 of the bottom wall 12. The first rail 20 is moved until the hooks 28 and the L-shaped retaining tabs (not shown) of the first rail 20 engage in the first square holes 122 and the first trapezoidal holes 124 of the bottom wall 12 respectively. Thus, the first rail 20 is mounted to the bottom wall 12.

The second rail 30 is placed on the bottom wall 12 parallel to the first rail 20 and beside the resilient plate 138, so that the resilient plate 138 is between the first rail 20 and the second rail 30. The second rail 30 is moved until the hooks 37 and the L-shaped tabs 38 of the second rail 30 engage in the second square holes 128 and the second trapezoidal holes 130 of the bottom wall 12 respectively. Thus, the second rail 30 is mounted to the bottom wall 12.

The third rail 40 is placed on the bottom wall 12 parallel and close to the rear wall 16. The third rail 40 is moved until the hooks 47, L-shaped tabs 48 and protrusions 49 of the third rail 40 engage in the third square holes 132 and the third trapezoidal holes 134 of the bottom wall 12 and the retaining apertures 166 of the rear wall 16 respectively. Thus, the third rail 40 is mounted to the bottom wall 12 and the rear wall 16.

In assembly of the drive bracket 50 to the case 10, the wings 526 of the drive bracket 50 are aligned with the first and second sliding spaces 26, 36 of the first and second rails 20, 30 respectively. The drive bracket 50 is slid along the first and second rails 20, 30 until the retaining portions 524 of the drive bracket 50 engage in the first hooks 126 of the bottom wall 12, and the detent block 1382 of the resilient plate 138 of the bottom wall 12 snappingly engages with the detent plate 528 such that the detent block 1382 abuts an inner face of the detent plate 528. Thus, the drive bracket 50 is fixedly attached to the case 10.

In assembly of the motherboard support tray 60 to the case 10, the guiding edges 622, 624 of the motherboard support tray 60 are aligned with the third and fourth sliding spaces 36, 46 of the second and third rails 30, 40 respectively. The motherboard support tray 60 is slid along the second and third rails 30, 40 until an edge portion of the support plate 62 of the motherboard support tray 60 corresponding to the retaining plates 626 engages in the second hooks 136 of the bottom wall 12, and the rear plate 65 of the motherboard support tray 60 is fittingly received in the mounting opening 162 of the rear wall 16 thereby cooperatively forming a rear side of the computer enclosure. Thus the motherboard support tray 60 is loosely mounted to case 10. Finally, two fasteners such as screws (not shown) are respectively inserted through the retaining holes 628 of the retaining plates 626 and engaged in the corresponding fastening holes 1392 of the power supply rack 139 of the case 10. Thus, the motherboard support tray 60 is removably fastened to the case 10.

When the drive bracket 50 and the motherboard support tray 60 are mounted to the case 10, the first lateral plate 54 of the drive bracket 50 and the second lateral plate 64 of the motherboard support tray 60 cooperatively form a second sidewall (not labeled) of the case 10. An opening (not labeled) is defined at a top of the case 10, above the drive bracket 50 and the motherboard support tray 60. A reinforcing plate 70 is positioned at said opening, and attached to the front wall 14 and the rear wall 16 by means such as riveting. This prevents deformation of the front wall 14 and the rear side (not labeled) when the drive bracket 50 and the motherboard support tray 60 are mounted to the case 10.

Figure 11:
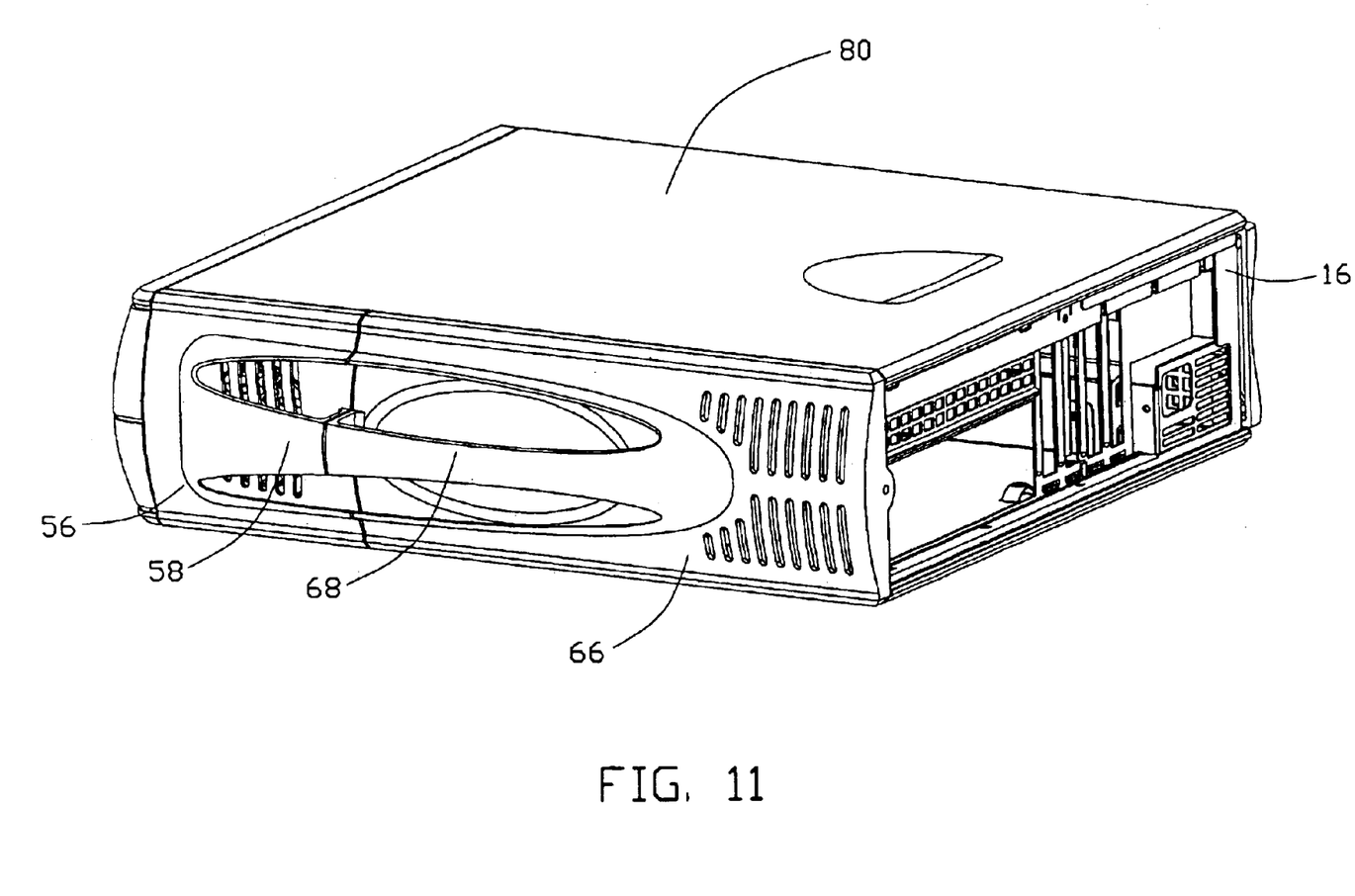
FIG. 11 is similar to FIG. 10, but showing a plurality of plastic enclosures mounted to outsides of the computer enclosure, and being viewed from another aspect.
Figure 12:
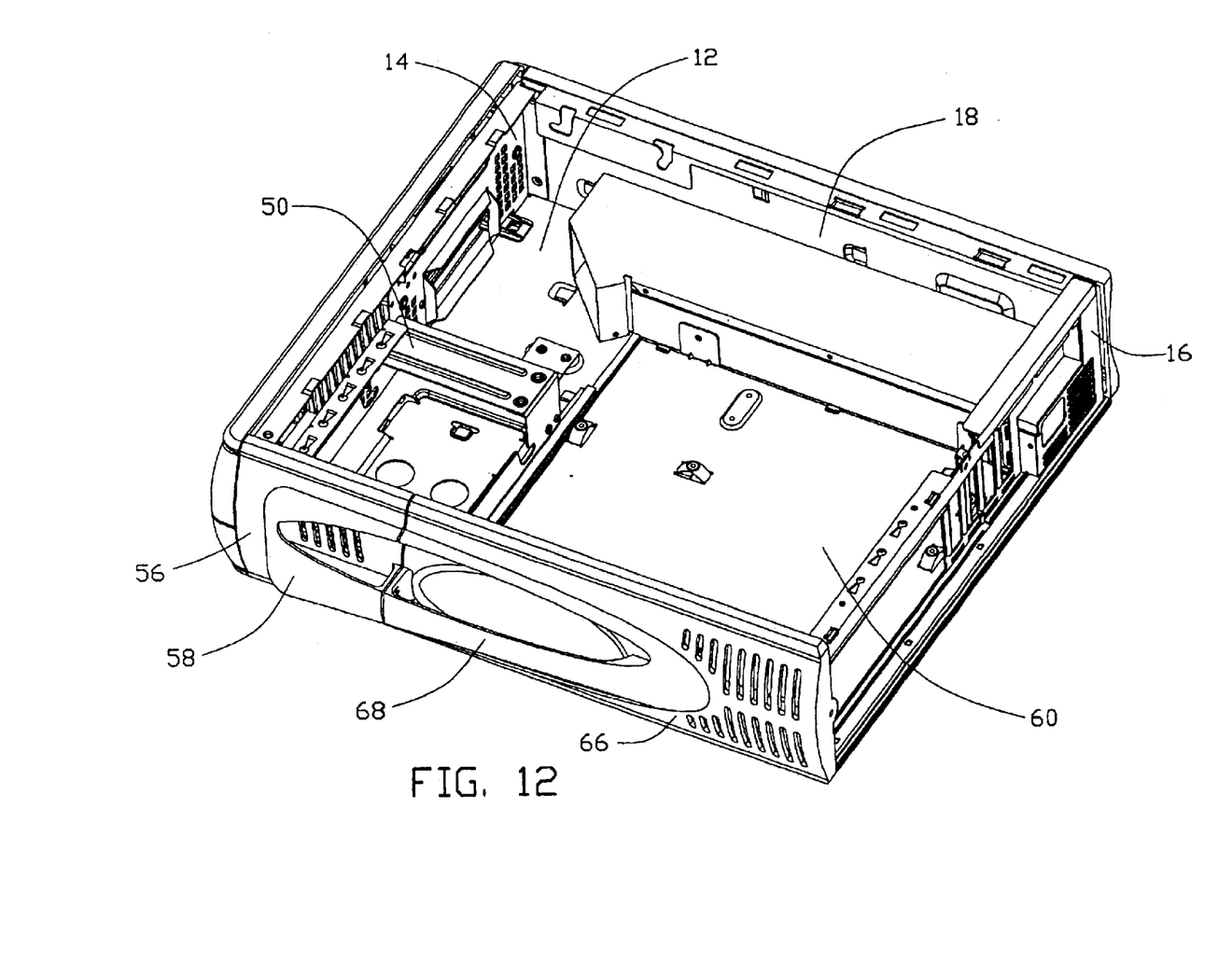
FIG. 12 is similar to FIG. 11, but with a top cover and a reinforcing plate removed to reveal an inside of the case.

Referring to FIGS. 11 and 12, a plurality of plastic enclosures (only some labeled) are mounted to outsides of the bottom wall 12, the front wall 14 and the first sidewall 18. Side covers 56, 66 are mounted to the first lateral plate 54 of the drive bracket 50 and the second lateral plate 64 of the motherboard support tray 60 respectively. Handles 58, 68 are provided on the side covers 56, 66 respectively. A plurality of electronic components is mounted in the computer enclosure. Finally, a top cover 80 is mounted to the case 10 at the top thereof. The computer enclosure is thus fully assembled. Users can conveniently move the computer enclosure using the handles 58, 68.

When components in the computer enclosure need to be maintained or replaced, the drive bracket 50 or the motherboard support tray 60 may be removed as follows. The top cover 80 is removed from the case 10. The resilient plate 138 is pressed into the receiving portion 137 until the detent block 1382 is released from the detent plate 528 of the drive bracket 50. The drive bracket 50 is then easily pulled out from the case 10 by operating the handle 58. The screws (not labeled) are disengaged from the retaining holes 628 of the motherboard support tray 60. The motherboard support tray 60 is then easily pulled out from the case 10 by operating the handle 68.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a case comprising a bottom wall, and a rear wall perpendicularly extending from the bottom wall;
   a first rail mounted on the bottom wall, a first sliding space being defined in the first rail and being parallel to the rear wall;
   a second rail mounted on the bottom wall parallel to the first rail, the second rail defining a second sliding space in a side thereof and a third sliding space in an opposite side thereof, the second sliding space being opposite from the first sliding space;
   a third rail mounted on the bottom wall close to the rear wall, the third rail defining a fourth sliding space opposite from the third sliding space;
   a drive bracket mounted in the case, the drive bracket comprising a bottom plate and two wings extending from opposite sides of the bottom plate, the wings movably engaging in the first sliding space and the second sliding space respectively; and
   a support tray mounted in the case, the support tray comprising two guiding portions extending from opposite sides thereof, the guiding portions movably engaging in the third sliding space and the fourth sliding space respectively.

2. The computer enclosure as claimed in claim 1, wherein a mounting opening is defined in the rear wall.

3. The computer enclosure as claimed in claim 1, wherein a front wall extends perpendicularly from the bottom wall of the case.

4. The computer enclosure as claimed in claim 3, wherein a first sidewall extends perpendicularly from the bottom wall of the case between the front wall and the rear wall.

5. The computer enclosure as claimed in claim 1, wherein the first rail comprises a first base plate and a first railing extending from the first base plate, the first sliding space being defined between the first base plate and the first railing.

6. The computer enclosure as claimed in claim 1, wherein the bottom wall of the case comprises a recessed receiving portion, a resilient plate is retained above the receiving portion, and a detent block is formed on the resilient plate.

7. The computer enclosure as claimed in claim 3, wherein the case defines an opening at a side thereof opposite from the first sidewall, and the drive bracket and the support tray are mounted to the case though the opening.

8. The computer enclosure as claimed in claim 4, wherein a first lateral plate perpendicularly extends from a side of the bottom plate of the drive bracket, a second lateral plate perpendicularly extends from a side of the support tray, and the first lateral plate and the second lateral plate cooperatively form a second sidewall of the case at the opening.

9. The computer enclosure as claimed in claim 4, wherein a reinforcing plate is mounted to the case between the front wall and the back wall.

10. The computer enclosure as claimed in claim 5, wherein the second rail comprises a second base plate, and a second railing and a third railing extending from the second base plate, the second sliding space being defined between the second base plate and the second railing, the third sliding space being defined between the second base plate and the third railing.

11. The computer enclosure as claimed in claim 6, wherein a detent plate downwardly extends from a free end of the bottom plate of the drive bracket, the detent plate abutting the detent block of the resilient plate to prevent the drive bracket from moving out from the case.

12. The computer enclosure as claimed in claim 8, wherein a power supply rack is arranged on the bottom wall of the case adjacent the first sidewall, and a plurality of fastening holes is defined in the power supply rack.

13. The computer enclosure as claimed in claim 9, wherein a plastic enclosure is attached to the reinforcing plate.

14. The computer enclosure as claimed in claim 10, wherein the third rail comprises a third base plate and a fourth railing extending from the third base plate, the fourth sliding space being defined between the third base plate and the fourth railing.

15. The computer enclosure as claimed in claim 12, wherein a plurality of retaining plates extends from a side of the support tray opposite from the second lateral plate, and each of the retaining plates defines a retaining hole corresponding to one of the fastening holes of the power supply rack.

16. The computer enclosure as claimed in claim 13, wherein a plurality of plastic enclosures is attached to outsides of the front wall and the first sidewall of the case.

17. The computer enclosure as claimed in claim 13, wherein two plastic side covers are attached to the first and second lateral plates of the drive bracket and the support tray respectively.

18. The computer enclosure as claimed in claim 14, wherein each of the first, second and third base plates of the first, second and third rails forms a plurality of hooks and retaining tabs, and the bottom wall of the case defines a plurality of retaining holes engagingly receiving the hooks and retaining tabs of the first, second and third rails.

19. A computer enclosure comprising:
a case comprising a bottom wall, and front and rear walls perpendicular to the bottom wall, the bottom, front and rear walls cooperatively defining an opening therebetween at a lateral side of the case;
at least one pair of parallel rails mounted to the bottom wall, the rails being perpendicular to the opening; and
at least one bracket movably engaged between the at least one pair of rails,
wherein the at least one bracket comprises a lateral plate received in the opening and forming a sidewall of the case.

20. The computer enclosure as claimed in claim 19, wherein the rear wall defines a mounting opening, and the at least one bracket comprises a rear plate mounted at the mounting opening and forming a portion of the rear wall.

21. The computer enclosure as claimed in claim 19, wherein the computer enclosure comprises one first bracket, and the first bracket comprises a first lateral plate.

22. The computer enclosure as claimed in claim 19, wherein a reinforcing plate is mounted to the case and covers the at least one bracket.

23. The computer enclosure as claimed in claim 21, wherein the computer enclosure comprises said first bracket, and a second bracket comprising a second lateral plate, and the first lateral plate and the second lateral plate cooperatively form the sidewall of the case.

24. The computer enclosure as claimed in claim 21, wherein the bottom wall of the case comprises a recessed receiving portion, a resilient plate is retained above the receiving portion, and a detent block is formed on the resilient plate, and the first bracket is retained in the case by the detent block.

25. The computer enclosure as claimed in claim 22, wherein a plastic enclosure is attached to the reinforcing plate.

26. The computer enclosure as claimed in claim 22, wherein a plastic enclosure is attached to an outside of the front wall of the case.

27. The computer enclosure as claimed in claim 23, wherein two plastic side covers are attached to the first and second lateral plates of the first and second brackets respectively.

28. A computer enclosure comprising:
a case defining a bottom wall with opposite first and second side walls extending perpendicularly at two opposite ends of said bottom wall;
a guiding structure formed in the case along a direction parallel to said first and second side walls; and
a tray adapted to support one electronic component thereon, said tray including means engageable with the guiding structure so as to allow the tray to move in said direction; wherein
said tray includes a support plate closely parallel to said bottom wall in an overlapped manner, and a lateral plate integrally extending upwardly from a side edge of the support plate and perpendicular to both said first and second side walls, said lateral plate resulting in a third side wall of said case when said tray is latchably located in a fixed innermost position in the case.

* * * * *